(12) United States Patent
Lim et al.

(10) Patent No.: US 10,299,310 B2
(45) Date of Patent: May 21, 2019

(54) WIRELESS DEVICE INCLUDING FIRST PLATFORM FOR LOCAL AREA AND SECOND PLATFORM FOR REMOTE AREA AND METHOD FOR WIRELESS DEVICE

(71) Applicant: LG ELECTRONICS INC., Seoul (KR)

(72) Inventors: Taesung Lim, Seoul (KR); Byungjoo Lee, Seoul (KR); Youngjun Jo, Seoul (KR); Seongyun Kim, Seoul (KR); Seungmyeong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 15/423,463

(22) Filed: Feb. 2, 2017

(65) Prior Publication Data

US 2017/0223764 A1    Aug. 3, 2017

Related U.S. Application Data

(60) Provisional application No. 62/290,405, filed on Feb. 2, 2016.

(51) Int. Cl.
| | |
|---|---|
| *H04W 76/16* | (2018.01) |
| *H04W 60/00* | (2009.01) |
| *H04W 4/70* | (2018.01) |
| *H04W 4/60* | (2018.01) |
| *H04W 76/11* | (2018.01) |
| *H04W 84/12* | (2009.01) |
| *H04W 88/06* | (2009.01) |

(52) U.S. Cl.
CPC ............. *H04W 76/16* (2018.02); *H04W 4/60* (2018.02); *H04W 4/70* (2018.02); *H04W 60/005* (2013.01);
(Continued)

(58) Field of Classification Search
CPC ..... H04W 4/70; H04W 60/005; H04W 84/12; H04W 76/16; H04W 4/60; H04W 76/11;
(Continued)

(56) References Cited

U.S. PATENT DOCUMENTS

| | | | |
|---|---|---|---|
| 9,591,582 B1* | 3/2017 | Rabii | ................... H04W 52/028 |
| 2011/0081858 A1* | 4/2011 | Tolentino | ............... H04B 15/00 |
| | | | 455/41.2 |

(Continued)

*Primary Examiner* — Paul H Masur
*Assistant Examiner* — Michael K Phillips
(74) *Attorney, Agent, or Firm* — Lee Hong Degerman Kang & Waimey

(57) ABSTRACT

A method for a wireless device including a first module for a local area and a second module for the first module and a remote area according to an exemplary embodiment of this specification may include the steps of transmitting, by a seeker STA having the first module interconnected with the second module, a first version message including first unique information of the seeker STA to an advertiser STA, and receiving a second version message including second unique information from the advertiser STA, storing the first and second unique information as first and second content information, and configuring a service session with the advertiser STA, transmitting the first content information to a wideband server that is associated with the second module, and transmitting a retrieve request message including the second content information for retrieving a remote service for the remote area to the wideband server.

6 Claims, 13 Drawing Sheets

(52) U.S. Cl.
CPC ............ *H04W 76/11* (2018.02); *H04W 84/12* (2013.01); *H04W 88/06* (2013.01)

(58) Field of Classification Search
CPC ....... H04W 88/06; H04W 76/15; H04W 4/80; H04W 88/04; H04W 92/18; H04W 76/14; H04L 67/104
See application file for complete search history.

(56) References Cited

U.S. PATENT DOCUMENTS

| | | | |
|---|---|---|---|
| 2011/0289186 A1* | 11/2011 | Bell | B60R 25/00 709/217 |
| 2012/0054326 A1* | 3/2012 | Royon | G06F 8/10 709/223 |
| 2013/0132058 A1* | 5/2013 | Butler | H04L 67/38 703/21 |
| 2015/0261972 A1* | 9/2015 | Lee | G06F 21/6218 713/165 |
| 2015/0327160 A1* | 11/2015 | Yang | H04W 48/18 370/254 |
| 2015/0332258 A1* | 11/2015 | Kurabi | G06Q 20/401 705/71 |
| 2016/0006837 A1* | 1/2016 | Reynolds | H04W 84/18 709/203 |
| 2016/0080932 A1* | 3/2016 | Jin | H04W 8/183 455/418 |
| 2017/0006117 A1* | 1/2017 | Kafle | H04L 65/4084 |
| 2017/0237818 A1* | 8/2017 | Fang | H04L 29/08 709/227 |

* cited by examiner

WIRELESS DEVICE INCLUDING FIRST PLATFORM FOR LOCAL AREA AND SECOND PLATFORM FOR REMOTE AREA AND METHOD FOR WIRELESS DEVICE

CROSS-REFERENCE TO RELATED APPLICATIONS

Pursuant to 35 U.S.C. § 119(e), this application claims the benefit of U.S. Provisional Application No. 62/290,405, filed on Feb. 2, 2016, the contents of which are hereby incorporated by reference herein in its entirety.

TECHNICAL FIELD

This specification relates to a wireless device and, most particularly, to a wireless device including a first platform for a local area and a second platform for a remote area and a method for the same.

BACKGROUND

The Wi-Fi Alliance (WFA) is carrying out research on a Wi-Fi Direct Service (hereinafter referred to as 'WFDS') that supports diverse services (e.g., Send, Play, Display, Print, and so on) using a Wi-Fi Direct link. According to the WFDS, an application may be controlled or managed by a service platform that is referred to as an Application Service Platform (ASP).

A WFDS device supporting WFDS may include diverse types of devices that support a wireless LAN system, such as a display device, a printer, a digital camera, a projector, a smart phone, and so on. Additionally, the WFDS device may include an STA and an AP. And, WFDS device existing in a WFDS network may be directly connected to one another.

SUMMARY OF THE INVENTION

A method for a wireless device including a first module for a local area and a second module for the first module and a remote area according to an exemplary embodiment of this specification may include the steps of transmitting, by a seeker STA having the first module interconnected with the second module, a first version message including first unique information of the seeker STA to an advertiser STA, and receiving, by the seeker STA, a second version message including second unique information from the advertiser STA, wherein the first unique information and the second unique information correspond to information that is based on the first module, storing, by the seeker STA, the first and second unique information as first and second content information that is based on the second module, and configuring a service session, by the seeker STA, with the advertiser STA based on the first unique information and the second unique information, when the service session is configured, transmitting, by the seeker STA, the first content information to a wideband server that is associated with the second module, and transmitting, by the seeker STA, a retrieve request message including the second content information for retrieving a remote service for the remote area to the wideband server.

DETAILED DESCRIPTION

The above-described characteristics and the following detailed description are merely exemplary details that are given to facilitate the description and understanding of this specification. More specifically, this specification may be implemented in another format without being restricted only to the exemplary embodiment presented herein. The following exemplary embodiments are merely examples that are given to fully disclose this specification and to describe this specification to anyone skilled in the technical field to which this specification belongs. Accordingly, if a plurality of methods for implementing the elements of this specification exist, it should be clarified that this specification can be implemented by any one specific or similar method.

In this specification, if a structure is described to include specific elements, or if a procedure is described to include specific process steps, this indicates that other elements or other process steps may be further included. More specifically, it will be apparent that the terms used in this specification are merely given to describe a specific exemplary embodiment of the present invention and that such terms will not be used to limit the concept or idea of this specification. Furthermore, it will also be apparent that the examples given to facilitate the understanding of the invention also include complementary embodiments of the given examples.

Each of the terms used in this specification is given a meaning that can be generally understood by anyone skilled in the technical field to which this specification belongs. Each of the terms that are generally used herein should be understood and interpreted by its uniform meaning in accordance with the context of this specification. Moreover, unless its meaning clearly defined, each of the terms used in this specification should not be interpreted by its excessively ideal or formal meaning. The appended drawings are given to describe the exemplary embodiment of this specification.

Figure 1:
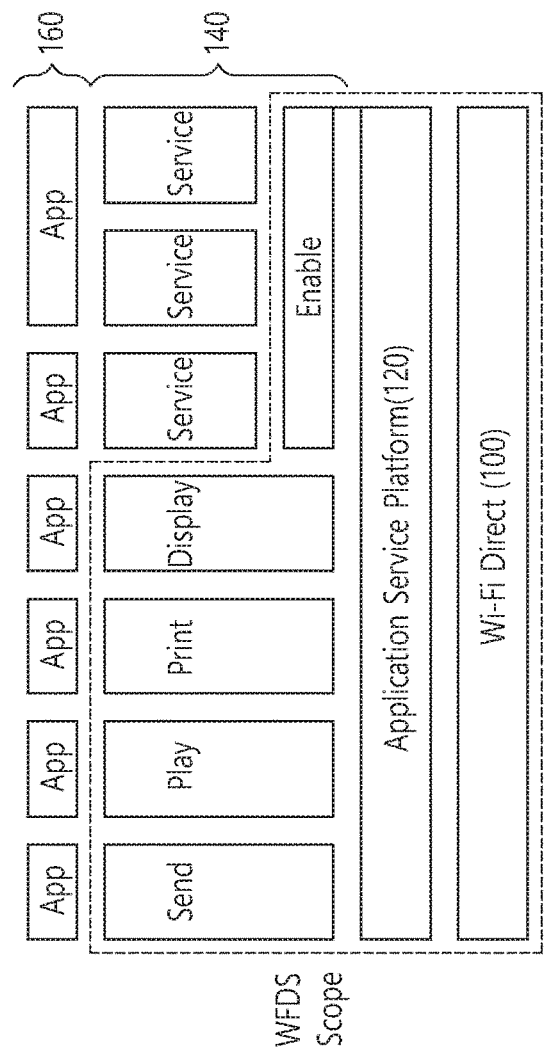
FIG. 1 is a conceptual diagram illustrating elements configuring a Wi-Fi Direct Service framework.

FIG. 1 is a conceptual diagram illustrating elements configuring a Wi-Fi Direct Service (WFDS) framework.

Referring to FIG. 1, the WFDS framework may include a Wi-Fi Direct layer 100, an ASP 120, a service layer 140, and an application layer 160. The Wi-Fi Direct layer 100 corresponds to a medium access control (MAC) layer that is defined in the Wi-Fi Direct specification.

More detailed description of the Wi-Fi Direct specification, which is mentioned above, is provided in Wi-Fi Peer-to-Peer Services (P2Ps) Technical specification (for Wi-Fi Direct® services certification) Version 1.1, which was disclosed in 2014.

A wireless communication may be implemented under the Wi-Fi Direct layer 100 by a physical layer (not shown) that is compatible with a Wi-Fi PHY. The Application Service Platform (hereinafter referred to as 'ASP') 120 may be defined above the Wi-Fi Direct layer 100.

The ASP 120 corresponds to a common shared platform, and the ASP 120 may perform functions of session management, service command processing, control between ASPs, and security between the ASP 120 and the application layer 160 and the Wi-Fi Direct layer 100, which are respectively located above and below the ASP 120.

The service layer 140 is also defined above the ASP 120. For example, four basic services, which correspond to a Send service, a Play service, a Display service, and a Print service, and services that are defined in a third-party application may be supported in the service layer 140. Additionally, the service layer 140 may also support Wi-Fi Serial Bus (WSB), Wi-Fi Docking, or Neighbor Awareness Networking (NAN).

The application layer 160 may provide a user interface (UI). Additionally, the application layer 160 may be expressed in a format allowing a human being to recognize information that is delivered from a lower layer. Furthermore, the application layer 160 may also deliver a user input to a lower layer.

Figure 2:
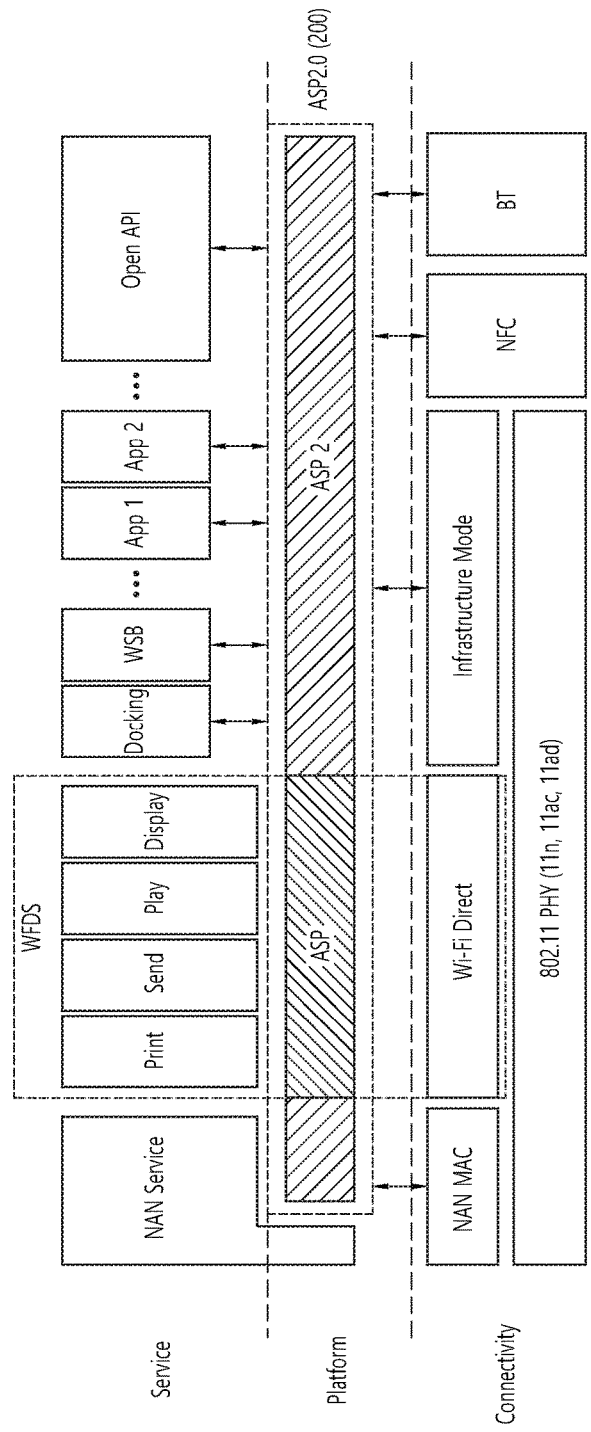
FIG. 2 is a block diagram illustrating elements configuring a Wi-Fi Direct Service framework to which an exemplary embodiment of the present invention can be applied.

FIG. 2 is a block diagram illustrating elements configuring a Wi-Fi Direct Service (WFDS) framework to which an exemplary embodiment of the present invention can be applied. Unlike the framework of FIG. 1, the framework of FIG. 2 proposes a Neighbor Awareness Networking (NAN) mode or a Wi-Fi Infrastructure mode as an additional connectivity scheme. More specifically, the structure of FIG. 2 may be controlled or managed by an ASP 2.0 platform (hereinafter referred to as ASP2), which includes the related art Application Service Platform (ASP).

For example, the ASP2 200 performs discovery of a device/service based on at least one of Wi-Fi Direct (also referred to as P2P), Neighbor Awareness Networking (NAN), near field communication (NFC), Bluetooth low energy (LE), and Wi-Fi infrastructure, and the ASP2 200 may be in charge of performing a series of process steps up to the usage of a service, such as session configuration and connection of the discovered device/service.

Figure 3:
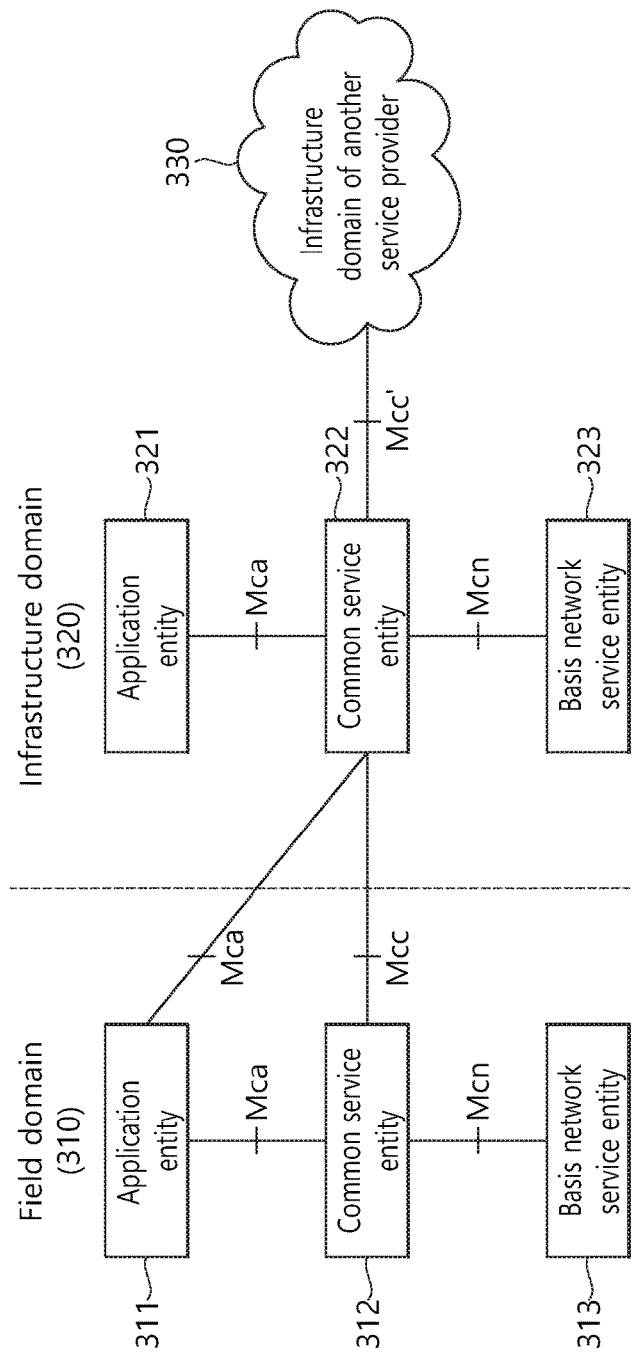
FIG. 3 is a conceptual diagram illustrating a network architecture supporting a oneM2M service platform.

FIG. 3 is a conceptual diagram illustrating a network architecture supporting a oneM2M service platform. Referring to FIG. 3, the oneM2M service platform may be divided into a field domain area 310, wherein a sensor, an actuator, a device, and a gateway are located, and an infrastructure domain area 320, wherein a server of a service provider is located.

Each domain area may be divided into an application entity (hereinafter referred to as 'AE'), which corresponds to an application layer, a common service entity (hereinafter referred to as 'CSE'), which corresponds to a common service platform layer, and a network service entity (hereinafter referred to as 'NSE'), which corresponds to a network service layer, so as to respectively define its function level.

Referring to FIG. 3, the field domain area 310 may include an application entity 311, a common service entity 312, and a network service entity 313.

The infrastructure domain area 320 may include an application entity 321, a common service entity 322, and a network service entity 323.

More specifically, the application entity 311 and 312 may indicate an application function logic for providing a M2M service. The application entity 311 and 312 may be identified by a unique identification information (AE-ID). For example, the application entity 311 and 312 may correspond to an application for a control system, an application for a smart grid system, or an application for a health care system.

The common service entity 312 and 322 may provide a common service function of the oneM2M common service platform just as middleware and/or software of a computer system. The common service entity 312 and 322 may be identified by a unique identification information (CSE-ID).

Additionally, the common service entity 312 and 322 may include 12 common service functions (hereinafter referred to as 'CSFs'). The common service entity 312 and 322 may provide the above-described common service function through a reference point.

As an abstraction area for a sub network service of a middleware in which the common service entity 312 and 322 is located, the network service entity 313 and 323 may provide a network service to the common service entity 312 and 322.

For example, the network service entity 313 and 323 may provide network services, such as device management service, location management service, device triggering service, and so on.

Referring to FIG. 3, four reference points Mca, Mcc, Mcn, and Mcc' may be defined. By using the four reference points Mca, Mcc, Mcn, and Mcc', interconnection may be established between the application entity 311 and 321, the common service entity 312 and 322, and the network service entity 313 and 323.

More specifically, the Mca reference point may refer to a connection point between an application entity (AE) and a common service entity (CSE). The Mca reference point may correspond to a connection point of an application programming interface (API) for allowing the application entity (AE) to use a common service function (CSF) that is provided by the common service entity (CSE). The Mca reference point may correspond to a connection point for the communication between the application entity (AE) and the common service entity (CSE).

The Mcc reference point may refer to a connection point between two common service entities (CSEs). The Mcc reference point may correspond to a connection point that discloses a service between two common service entities (CSEs). The Mcc reference point may correspond to a connection point for a communication between two common service entities (CSEs).

The Mcn reference point may refer to a connection point between a common service entity (CSE) and a network service entity (NSE). The Mcn reference point may correspond to a connection point allowing the common service entity (CSE) to use a network service function that is provided by the network service entity (NSE).

The Mcc' reference point may refer to a connection point that is connected to a common service entity (CSE) of an infrastructure domain 330 of another service provider. The Mcc' reference point may correspond to a connection point that discloses a service between common service entities (CSEs) each belonging to a different service provider. The Mcc' reference may correspond to a connection point supporting communication between common service entities (CSEs) each belonging to a different service provider.

Figure 4:
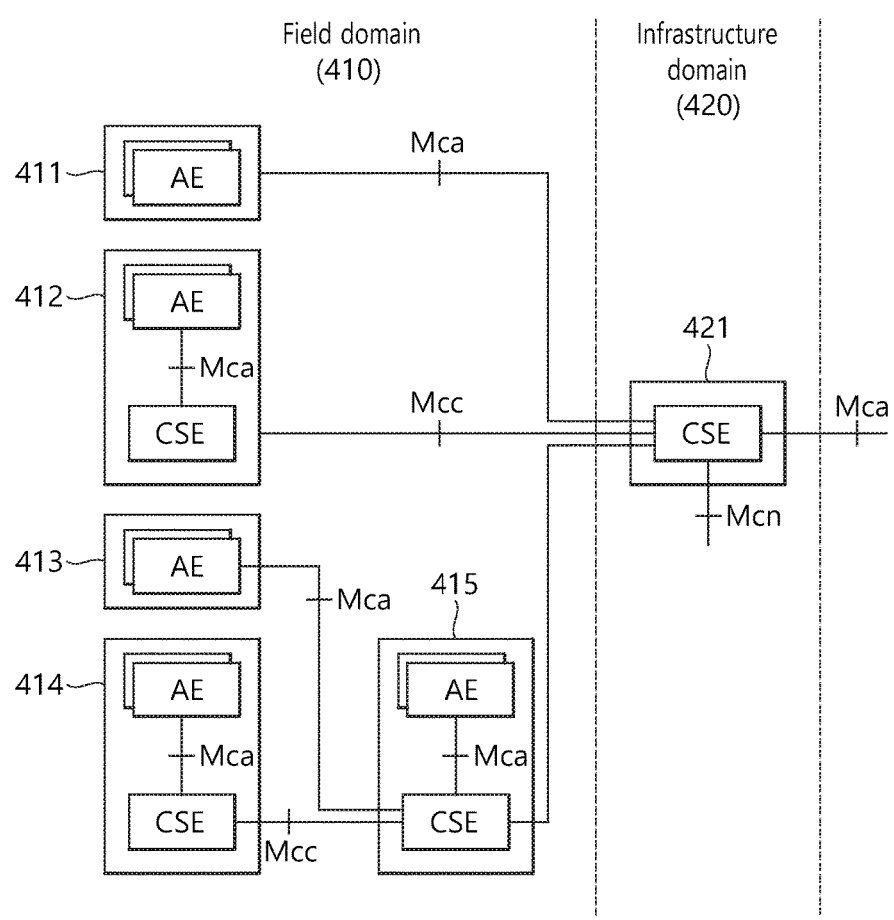
FIG. 4 is a diagram illustrating a network architecture supporting a oneM2M service platform.

FIG. 4 is a diagram illustrating a network architecture supporting a oneM2M service platform.

Each domain area may include one or more nodes. Each node may include one or more application entities (AEs) or common service entities (CSEs).

More specifically, an application dedicated node (hereinafter referred to as 'ADN') may include at least one application entity (AE), and the application dedicated node (ADN) may correspond to a node that does not include a common service entity (CSE).

An application service node (hereinafter referred to as 'ASN') may include at least one application entity (AE), and the application service node (ASN) may correspond to a node that includes at least one common service entity (CSE).

A middle node (hereinafter referred to as 'MN') may include at least one common service entity (CSE), and the middle node (MN) may correspond to a node that does not include an application entity (AE).

An infrastructure node (hereinafter referred to as 'IN') may include at least one application entity (AE), and the infrastructure node (IN) may correspond to a node that include at least one common service entity.

Referring to FIG. 4, a field domain area 410 may include first to fifth nodes 411 to 415. An infrastructure domain area 420 may include a sixth node 421.

For example, the first node and the third node 411 and 413 may correspond to the application dedicated node (ADN). The second node and the fourth node 412 and 414 may correspond to the application service node (ASN). The fifth node may correspond to the middle node (MN). And, the sixth node 421 may correspond to the infrastructure node (IN).

The first node and the third node 411 and 413 may communicate with the middle node 415 or the infrastructure node 421 by using the Mca reference point. The fifth node 415 may communicate with the application service node 414, another middle node (not shown) or the infrastructure node 421 by using the Mcc reference point. Additionally, the fifth node 415 may communicate with the application dedicated node 413 by using the Mca reference point.

The sixth node 421 may communicate with the application dedicated node 413 by using the Mca reference point. And, the sixth node 421 may communicate with the application service node 412 or the middle node 415 by using the Mcc reference point.

Figure 5:
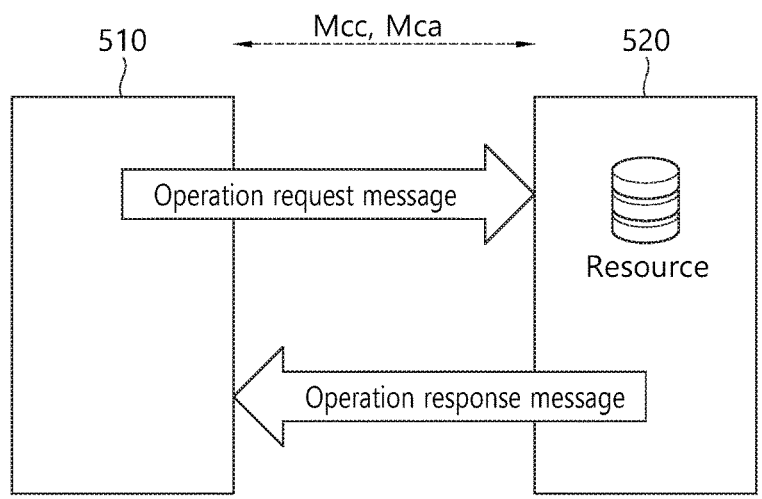
FIG. 5 is a conceptual diagram illustrating a communication flow at a reference point.

FIG. 5 is a conceptual diagram illustrating a communication flow at a reference point. The above-described oneM2M service platform may provide a common service function based on a resource indicating a data structure that is addressed by using a unique address (e.g., URI). The oneM2M service platform stores the resource in the common service entity (CSE) and does not store the resource in the application entity (AE).

Referring to FIG. 5, a first entity 510 may correspond to an originator, and a second entity 520 may correspond to a receiver. An exchange of information between both entities may be performed through the Mcc reference point or the Mca reference point.

Figure 6:
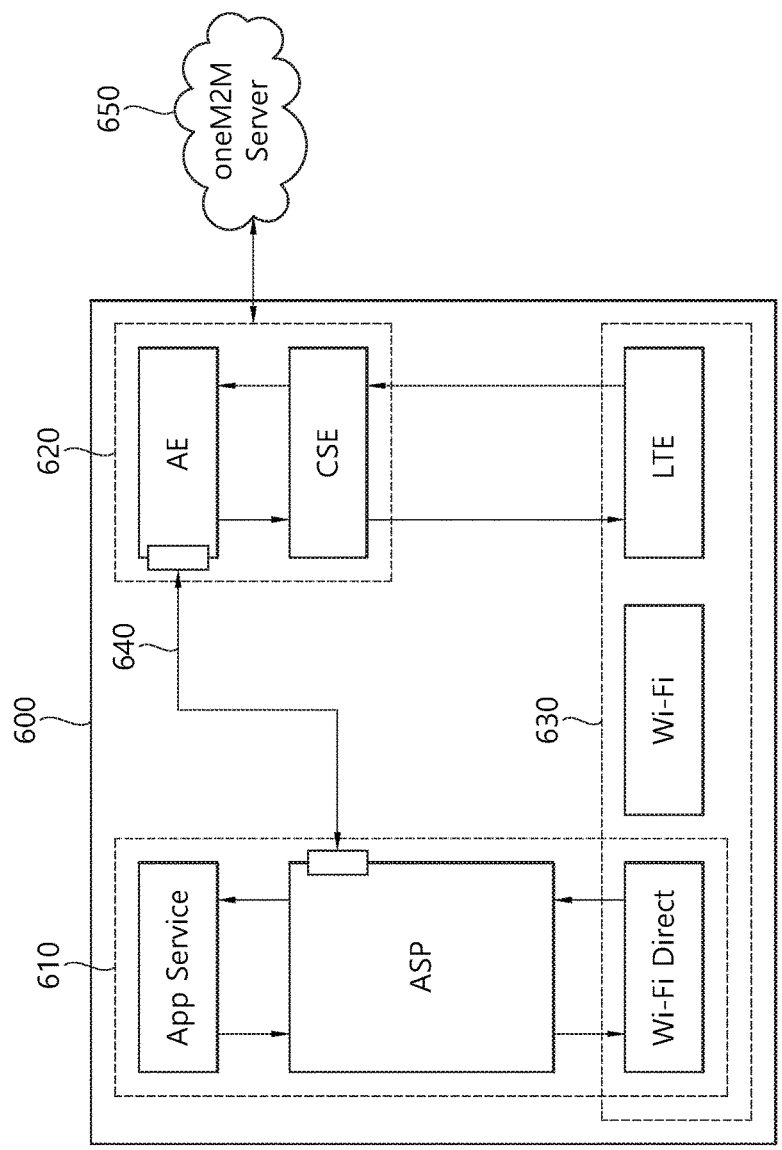
FIG. 6 is a block diagram illustrating a wireless LAN station according to the exemplary embodiment of the present invention.

FIG. 6 is a block diagram illustrating a wireless LAN station according to the exemplary embodiment of the present invention. Referring to FIG. 6, a wireless station (hereinafter referred to as 'STA') and not an access point (hereinafter referred to as 'AP') may be referred to as STA or device in this specification.

Referring to FIG. 1 to FIG. 6, the STA 600 according to the exemplary embodiment of the present invention may include first and second modules 610 and 620 and a network connectivity 630.

The first module 610 may include the ASP 120 or ASP2 200, which are described in FIG. 1 and FIG. 2. The STA including the first module 610 may support services to STAs that belong to a local area. In case of an STA that only includes the first module 610, the corresponding STA cannot support services to STAs that are located in areas outside of the local area.

The second module 620 may include entities (AE and CSE) of the oneM2M service platform that are described above in FIG. 3 to FIG. 5. The second module 620 may support services to STAs that are located in a remote area.

The application entity (AE) of the second module 620 may deliver information that is required by the common service entity (CSE) or the oneM2M service 650. For example, the application entity (AE) may store, call, update, or delete the information that is required by the common service entity (CSE) or the oneM2M service 650.

The network connectivity 630 may be connected to each of the modules 610 and 620 and may support network services to each of the modules 610 and 620.

The first module 610 and the second module 620 of the STA according to the exemplary embodiment of the present invention may be interconnected to one another. For example, the first module 610 and the second module 620 may be connected to one another through an application programming interface (API) 640. More specifically, the STA according to the exemplary embodiment of the present invention may support wideband based services without any restriction in a Wi-Fi based transmission range.

The oneM2M server 650 may be located in an area outside of the local area of the STA 600. The oneM2M server 650 may communicate with the STA 600 through the second module 620. The oneM2M server 650 may be understood as the middle node (MN) belonging to the infrastructure domain, which is described above in FIG. 4. For example, the oneM2M server 650 may correspond to a cloud server.

A procedure related to a session connection between STAs and a procedure performed by the STA in order to retrieve wideband services will hereinafter be described in detail.

Figure 7A:
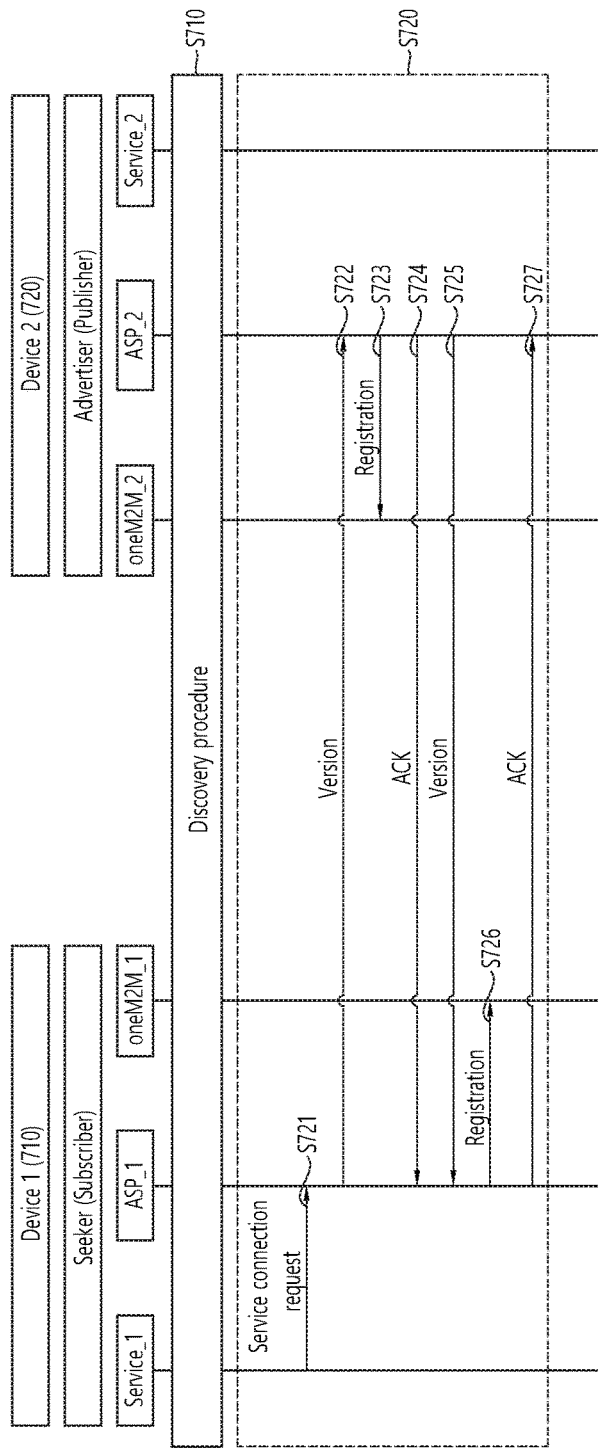
FIG. 7a and FIG. 7b are procedure flow charts illustrating operations of connecting sessions between STAs according to the exemplary embodiment of the present invention.
Figure 7B:
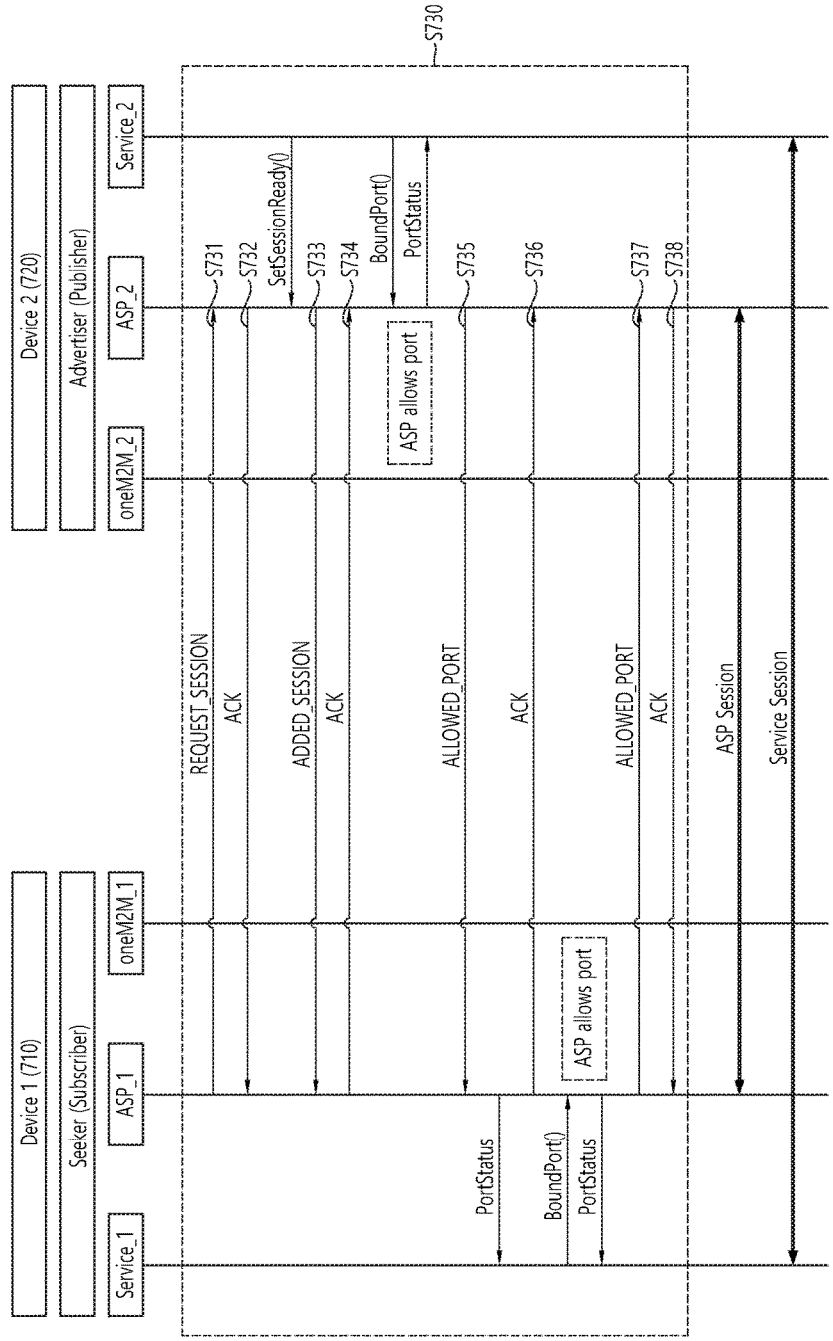

FIG. 7a and FIG. 7b are procedure flow charts illustrating operations of connecting sessions between STAs according to the exemplary embodiment of the present invention.

Referring to FIG. 1 to FIG. 7a, a first device 710 of FIG. 7a may include a first service layer (Service_1), which corresponds to a higher layer, a first ASP (ASP_1), and a first oneM2M platform (oneM2M_1). And, a second device 720 of FIG. 7a may include a second service layer (Service_2), which corresponds to a higher layer, a second ASP (ASP_2), and a second oneM2M platform (oneM2M_2).

The first ASP (ASP_1) may be understood as an element of the first module 610, which is described above in FIG. 6. Additionally, the first ASP (ASP_1) may also be understood as an element corresponding to the ASP or ASP2, which are mentioned above in FIG. 1 and FIG. 2. Similarly, the second ASP (ASP_2) may be understood as an element of the first module 610, which is described above in FIG. 6. Additionally, the second ASP (ASP_2) may also be understood as an element corresponding to the ASP or ASP2, which are mentioned above in FIG. 1 and FIG. 2.

The first oneM2M platform (oneM2M_1) may be understood as an element of the second module 620, which is described above in FIG. 6. Additionally, the first oneM2M platform (oneM2M_1) may also be understood as the entities (AE, CSE) that are mentioned above in FIG. 3 to FIG. 5. Similarly, the second oneM2M platform (oneM2M_2) may be understood as an element of the second module 620, which is described above in FIG. 6. Additionally, the second oneM2M platform (oneM2M_2) may also be understood as the entities (AE, CSE) that are mentioned above in FIG. 3 to FIG. 5.

Referring to FIG. 1 to FIG. 7a, the first device 710 and the second device 720 may perform a discovery procedure (step S710). More specifically, the discovery procedure (step S710) may include a P2P Device Discovery procedure, a P2P Service Discovery procedure, a P2P Provision Discovery procedure, a P2P Group Formation procedure, and a Join an existing P2P Group procedure. A more detailed description of each procedure may be verified in Wi-Fi Peer-to-Peer Services (P2Ps) Technical Specification Version 1.1.

Referring to FIG. 1 to FIG. 7a, the first device 710 and the second device 720 may perform a unique information exchange procedure (step S720). More specifically, in step S721, the first ASP (ASP_1) of the first device 710, which corresponds to a seeker, may receive a service connection request message from the first service layer (Service_1).

Subsequently, in step S722, the first device 710 may transmit a first version message to the second device 720 through the first ASP (ASP_1). In this case, the first version message may include the unique information of the first device 710. For example, the unique information of the first device 710 may include at least one of first media access control (MAC) address information that is associated with the first device 710, first service name information that is associated with the first device 710, and first device information of the first device 710.

In step S723, the second device 720 may store the unique information of the first device 710 in the second oneM2M platform (oneM2M_2). Subsequently, in step S724, the second device may transmit an ACK message to the first device 710 as a response to the first version message.

In step S725, the second device 720 may transmit a second version message to the first device 710 through the second ASP (ASP_2). In this case, the second version message may include unique information of the second device 720. For example, the unique information of the second device 720 may include at least one of second media access control (MAC) address information that is associated with the second device 720, second service name information that is associated with the second device 720, and second device information of the second device 720.

In step S726, the first device 710 may store the unique information of the second device 720 in the first oneM2M platform (oneM2M_1). Subsequently, in step S727, the first device 710 may transmit an ACK message to the second device 720 as a response to the second version message.

More specifically, in addition to the unique information that is mentioned in the unique information exchange procedure (step S720), it will be understood that other information capable of indicating unique information of the device may be additionally included in the version message. Additionally, in addition to storing its own unique information, each device may store information that is required for the interconnection between the ASP and the oneM2M platform (oneM2M) through the unique information exchange procedure (step S720).

Referring to FIG. 1 to FIG. 7b, the first device 710 and the second device 720 may perform a port negotiation procedure (step S730) after performing the unique information exchange procedure (step S720).

More specifically, in step S731, the first device 710 may transmit a request session (REQUEST SESSION) message to the second device 720. In this case, the request session message may include session_mac information, session_id information, advertisement_id information, and session_information information.

In step S732, the second device 720 may transmit an ACK message to the first device 710 as a response to the request session message and may then enter a SetSessionReady state.

Subsequently, in step S733, the second device 720 may transmit an added session (ADDED _SESSION) message to the first device 710. In this case, the added session message may include session_mac information and session_id information.

In step S734, the first device 710 may transmit an ACK message to the second device 720 as a response to the added session message.

Thereafter, by performing step S735 to step S738, the first device 710 and the second device 720 may perform negotiation on a port that can be used.

By performing the above-described procedures, an ASP session and a service session may be established between the first device 710 and the second device 720. Herein, data and diverse information may be exchanged between the first device 710 and the second device 720 through the ASP session and the service session.

Figure 8:
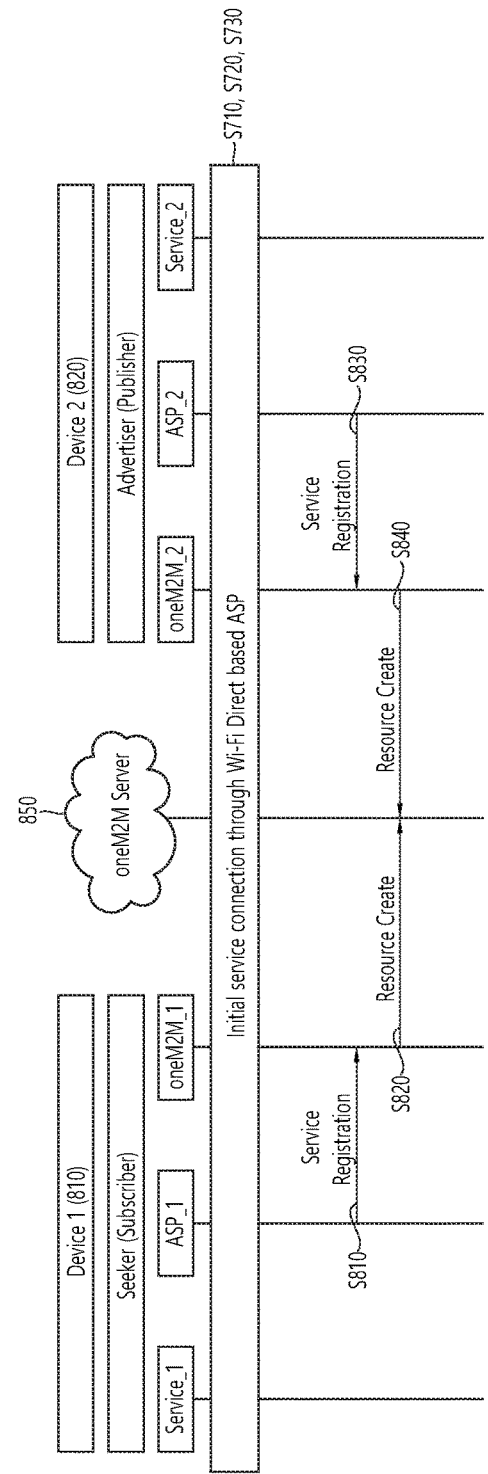
FIG. 8 is a procedure flow chart illustrating a procedure of registering information on an STA to a oneM2M server according to the exemplary embodiment of the present invention.

FIG. 8 is a procedure flow chart illustrating a procedure of registering information on an STA to a oneM2M server according to the exemplary embodiment of the present invention. A first device 810 and a second device 820 of FIG. 8 may be understood as the first device 710 and the second device 720 of FIG. 7. A oneM2M server 850 of FIG. 8 may be understood as the oneM2M server 650 of FIG. 6.

The description of FIG. 8 may be given provided that a service session between STAs is connected by carrying out steps S710, S720, and S730, which are described above in FIG. 7.

Referring to FIG. 8, unique information that is associated with each device 810 and 820 and information that is required for the interconnection between the ASP and the oneM2M platform (oneM2M) may be stored in the oneM2M server 850.

In step S810, the first device 810 may transmit a service registration message through a first ASP (ASP_1).

In step S820, the first device 810 may transmit a resource create message through a first oneM2M platform (oneM2M_1). In this case, the resource create message may include a resource belonging to a <Container> resource type. Also, the resource may include a <ContentInstance> resource type. The unique information that is associated with the first device may be included in content attribute information.

For example, the unique information that is associated with the first device 810 may include UUID information, service name information, public IP information, device name information, and MAC address information.

By performing step S810 and step S820, the unique information that is associated with the first device 810 may be stored in the oneM2M server 850, which is located in the remote area.

Similarly, by performing step S830 and step S840, the unique information that is associated with the second device 820 may be stored in the oneM2M server 850, which is located in the remote area.

Figure 9:
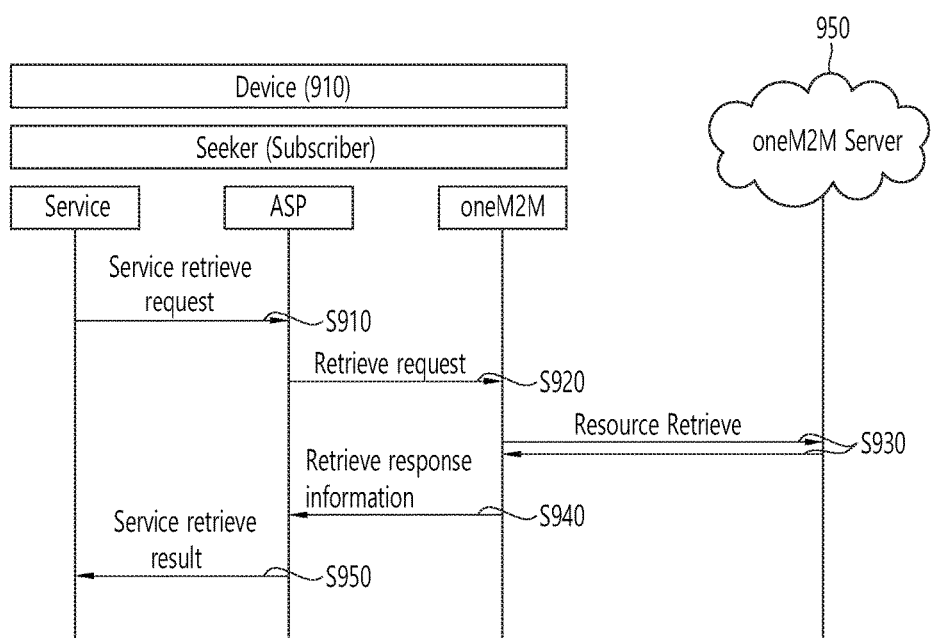
FIG. 9 to FIG. 11 are procedure flow charts illustrating procedure of discovering a service of a remote area that is performed by an STA according to the exemplary embodiment of the present invention.
Figure 10:
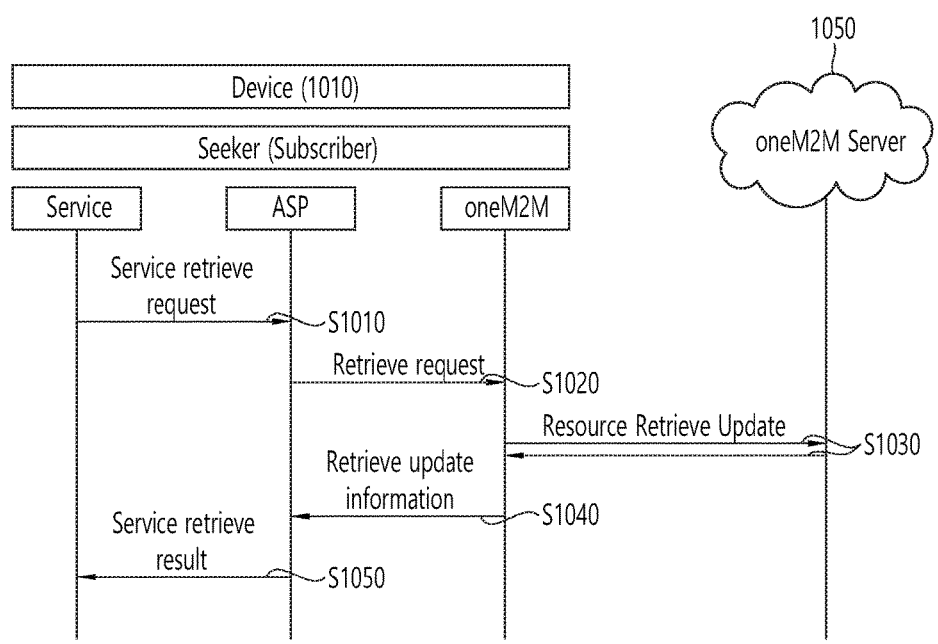
Figure 11:
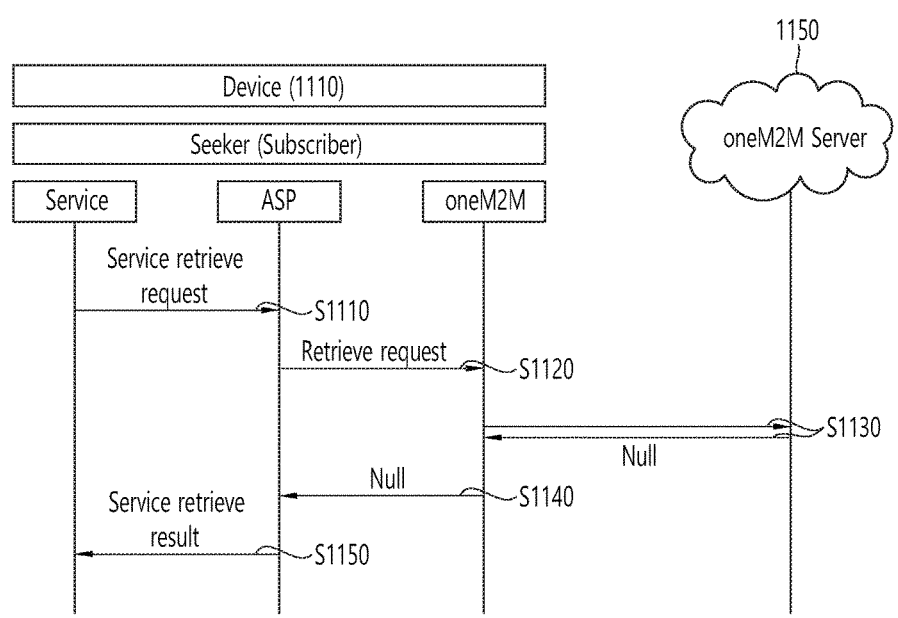

FIG. 9 to FIG. 11 are procedure flow charts illustrating procedure of discovering a service of a remote area that is performed by an STA according to the exemplary embodiment of the present invention.

Since the service that is to be provided (or received) by the device, which corresponds to the seeker, cannot be retrieved in the local area, the description of FIG. 9 to FIG. 11 will be given provided that the corresponding service is retrieved by expanding the area to the remote area.

Referring to FIG. 9, the device according to the exemplary embodiment of the present invention shows a procedure of performing discovery.

More specifically, the device 910 may be understood and the first device, which corresponds to the seeker, of FIG. 7. The device 910 may include a service layer, which corresponds to a higher layer, an application service platform (ASP), and a oneM2M platform (oneM2M).

The application service platform (ASP) of FIG. 9 may be understood as an element of the first module 610 of FIG. 6. Additionally, the application service platform (ASP) may be understood as an element corresponding to the ASP or ASP2, which are mentioned above in FIG. 1 and FIG. 2.

The oneM2M platform (oneM2M) of FIG. 9 may be understood as an element of the second module 620 of FIG. 6. Additionally, the oneM2M platform (oneM2M) may also be understood as entities (AE, CSE) that are described above in FIG. 3 to FIG. 5.

Referring to FIG. 9, in step S910, the device 910 may receive a service retrieve (or search) request from the service layer.

In step S920, the device 910 may transmit a request retrieve message from the application service platform (ASP) to the oneM2M (oneM2M) in accordance with the service retrieve request.

Accordingly, the device 910 may discover a oneM2M server 950 based on the unique information of an opposite party device, which is acquired through the discovery procedure (step S710) of FIG. 7. For example, the unique information of an opposite party device may include at least any one of UUID information, MAC address information, and public IP information.

In step S930, of the unique information of an opposite party device exists in the oneM2M server 950, the oneM2M server 950 may include opposite party information, which is stored in the oneM2M server 950 for the opposite party device, in a Resource Retrieve message and may then transmit the message including the corresponding information to the device 910. In this case, the opposite party information, which is included in the Resource Retrieve message, may correspond to UUID information, service name information, public IP information, device name information, and MAC address information.

In step S940, the device 910 may store the received opposite party information in the oneM2M platform (oneM2M). Additionally, the device 910 may transmit a retrieve response message including the received opposite party information from the oneM2M platform (oneM2M) to the application service platform (ASP).

Subsequently, in step S940, the device 910 may transmit a retrieve service result message including the received opposite party information from the application service platform (ASP) to the service layer (Service).

Referring to FIG. 10, a procedure for updating the device according to the exemplary embodiment of the present invention will hereinafter be described in detail. The procedure of FIG. 10 may be understood by referred to the procedure of FIG. 9.

In case of FIG. 10, in case the opposite party information is already stored in the oneM2M platform (oneM2M) of the device 1010, the device 101 may receive a Resource Retrieve Update message, which is transmitted from the oneM2M server 1050 in step S1030.

Thereafter, the device 1010 may be updated through step S1040 and step S1050.

Referring to FIG. 11, a procedure for performing discovery by a device according to another exemplary embodiment of the present invention will hereinafter be described in detail. The procedure of FIG. 11 may be understood by referring to the procedure of FIG. 9.

However, unlike in the case of FIG. 9, the case of FIG. 11 corresponds to a case when the unique information of the opposite party device does not exist in the oneM2M server 1150. Accordingly, the oneM2M server 1150 may transmit null information to the device 1110.

Figure 12:
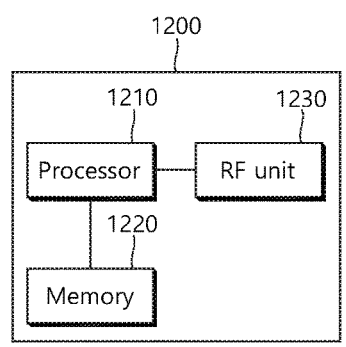
FIG. 12 is a block view illustrating a wireless device to which the exemplary embodiment of the present invention can be applied.

FIG. 12 is a block view illustrating a wireless device to which the exemplary embodiment of the present invention can be applied. The wireless device 1200 includes a processor 1210, a memory 1220, and a radio frequency (RF) unit 1230.

The processor 1210 implements the functions, processes, and/or methods proposed in the present invention. For example, the processor 1210 may be implemented to perform the operations according to the above-described exemplary embodiments of the present invention. For example, the processor 1210 may perform the operations that may be performed by the first device or the second device. The processor 1210 may perform the operations that are disclosed in the exemplary embodiments of FIG. 7 to FIG. 11.

The processor 1210 and 1260 may include an application-specific integrated circuit (ASIC), another chip set, a logical circuit, a data processing device, and/or a converter converting a baseband signal and a radio signal to and from one another.

The memory 1220 may include a read-only memory (ROM), a random access memory (RAM), a flash memory, a memory card, a storage medium, and/or another storage device.

The RF unit 1230 is connected to the processor 1210, thereby being capable of transmitting and/or receiving radio signals. The RF unit 1230 may include one or more antennas transmitting and/or receiving radio signals. When the exemplary embodiment is implemented as software, the above-described method may be implemented as a module (process, function, and so on) performing the above-described functions. The module may be stored in the memory 1220 and may be executed by the processor 1210. The memory 1220 may be located inside or outside of the processor 1210 and may be connected to the processor 1210 through a diversity of well-known means.

Although the detailed description of this specification has been given with reference to a detailed exemplary embodiment, variations or changes may be made without deviating from the scope and spirit of this specification. Therefore, the scope of this specification shall not be limited only to the description of the exemplary embodiments presented herein, and, therefore, it should be understood that the scope and spirit of this specification will be determined by the scope and spirit of the appended claims and the equivalent of the appended claims of this specification.

What is claimed is:

1. A method for a wireless device including a first module for a local area and a second module for a remote area, the method comprising:
   transmitting, by a first station (STA) including the first module and the second module, a first version message including first unique information of the first STA to a second STA based on the first module,
   wherein the first module and the second module are interconnected based on an application programming interface (API);
   receiving, by the first STA, a second version message including second unique information of the second STA from the second STA based on the first module;
   storing, by the first STA, the first and second unique information to the second module based on the API,
   wherein the first unique information is stored as first content information in the second module, and
   wherein the second unique information is stored as second content information in the second module;
   configuring, by the first STA, a service session for the local area with the second STA based on the first unique information and the second unique information;
   when the service session is configured, transmitting, by the first STA, the first content information to a wideband server related to the second module,
   wherein the first content information is stored in the wideband server;
   determining, by the first STA, whether a remote service is retrieved in the local area based on the service session;
   transmitting, by the first STA, a retrieve request message for retrieving the remote service for the remote area to the wideband server when the remote service is not retrieved; and
   receiving, by the first STA, a retrieve response message from the wideband server in response to the retrieve request message,
   wherein the retrieve response message includes additional information related to the remote service when information for the retrieve request message exists in the wideband server.

2. The method of claim 1, wherein, the retrieve response message includes null information when information for the retrieve request message does not exist in the wideband server.

3. The method of claim 1, wherein the first module includes an Application Service Platform (ASP), and wherein the second module includes an oneM2M Service Platform.

4. The method of claim 1, wherein the first unique information includes first Media Access Control (MAC) address information related to the first STA, first service name information related to the first STA, and first device information related to the first STA, and
   wherein the second unique information includes a second MAC address information related to the second STA, second service name information related to the second STA, and second device information related to the second STA.

5. The method of claim 1, wherein the transmitting the retrieve request message to the wideband server comprises:
   generating the retrieve request message for the second module based on a service registration message for the first module; and
   transmitting the retrieve request message to the wideband server through the second module.

6. A first station (STA) including a first module for a local area and a second module for a remote area, the first STA comprising:
   a transceiver transmitting and/or receiving wireless signals; and
   a processor being connected to the transceiver, wherein the processor is configured to:
   transmit a first version message including first unique information of the first STA to a second STA based on the first module,
   wherein the first module and the second module are interconnected based on an application programming interface (API),
   receive a second version message including second unique information of the second STA from the second STA based on the first module,
   store the first and second unique information to the second module based on the API,
   wherein the first unique information is stored as first content information in the second module, and
   wherein the second unique information is stored as second content information in the second module,
   configure a service session for the local area with the second STA based on the first unique information and the second unique information,
   transmit the first content information to a wideband server related to the second module when the service session is configured,
   wherein the first content information is stored in the wideband server,
   determine whether a remote service is retrieved in the local area based on the service session, and
   transmit a retrieve request message for retrieving the remote service for the remote area to the wideband server when the remote service is not retrieved.

* * * * *